US011873761B2

(12) United States Patent
Watase et al.

(10) Patent No.: US 11,873,761 B2
(45) Date of Patent: Jan. 16, 2024

(54) LIQUID FUEL INJECTOR

(71) Applicant: IHI CORPORATION, Tokyo (JP)

(72) Inventors: Takehiko Watase, Tokyo (JP); Kouta Kanai, Tokyo (JP); Nagayoshi Hiromitsu, Tokyo (JP); Junya Kowa, Tokyo (JP); Shinichiro Ishizaki, Tokyo (JP); Katsuyoshi Takahashi, Tokyo (JP); Tomohiro Ide, Tokyo (JP); Shonosuke Kita, Tokyo (JP); Mitsunori Itoh, Tokyo (JP); Yuki Iwaki, Tokyo (JP); Narumi Ando, Tokyo (JP); Hitoshi Hattori, Tokyo (JP); Kazuo Yonekura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 41 days.

(21) Appl. No.: 17/646,381

(22) Filed: Dec. 29, 2021

(65) Prior Publication Data

US 2022/0120222 A1 Apr. 21, 2022

Related U.S. Application Data

(63) Continuation of application No. PCT/JP2020/035022, filed on Sep. 16, 2020.

(30) Foreign Application Priority Data

Oct. 23, 2019 (JP) ................. 2019-192534

(51) Int. Cl.
*F02C 7/232* (2006.01)
*F23R 3/28* (2006.01)
(Continued)

(52) U.S. Cl.
CPC ............ *F02C 7/232* (2013.01); *F23D 11/383* (2013.01); *F23R 3/14* (2013.01); *F23R 3/28* (2013.01); *F23R 3/343* (2013.01)

(58) Field of Classification Search
CPC ...... F02C 7/232; F23D 11/107; F23D 11/383; F23R 3/14; F23R 3/28; F23R 3/283; F23R 3/286; F23R 3/30; F23R 3/32; F23R 3/343
See application file for complete search history.

(56) References Cited

U.S. PATENT DOCUMENTS

| 10,190,774 B2 | 1/2019 | Mook et al. |
| 2007/0028619 A1 | 2/2007 | Spooner |

(Continued)

FOREIGN PATENT DOCUMENTS

| EP | 1 793 165 A2 | 6/2007 |
| GB | 1 380 931 A | 1/1975 |

(Continued)

OTHER PUBLICATIONS

International Search Report dated Nov. 10, 2020 in PCT/JP2020/035022, filed on Sep. 16, 2020, 2 pages.

(Continued)

*Primary Examiner* — Loren C Edwards
(74) *Attorney, Agent, or Firm* — Oblon, McClelland, Maier & Neustadt, L.L.P.

(57) ABSTRACT

A liquid fuel injector includes a cylindrical primary fuel injecting body having a central axis; an annular shroud concentrically placed radially outside; and an annular secondary fuel injecting body placed concentrically with the primary fuel injecting body and the shroud between the primary fuel injecting body and the shroud. A plurality of inner swirlers placed at equal intervals in a circumferential direction are provided in an annular inner air passage formed between the primary fuel injecting body and the secondary fuel injecting body, and a plurality of outer swirlers placed at equal intervals in the circumferential direction are provided in an annular outer air passage formed between the secondary fuel injecting body and the shroud. The primary (Continued)

fuel injecting body is formed as a pressure spray-type injector, and the secondary fuel injecting body and the inner and outer air passages cooperatively constitute an airblast-type injector.

8 Claims, 5 Drawing Sheets

(51) Int. Cl.
  *F23D 11/38* (2006.01)
  *F23R 3/14* (2006.01)
  *F23R 3/34* (2006.01)

(56) References Cited

U.S. PATENT DOCUMENTS

| | | | |
|---|---|---|---|
| 2009/0100837 A1* | 4/2009 | Von Der Bank | F23R 3/14 60/737 |
| 2009/0255264 A1 | 10/2009 | McMasters et al. | |
| 2013/0047620 A1* | 2/2013 | Mao | F23D 11/107 29/428 |
| 2013/0327046 A1 | 12/2013 | Bobba et al. | |
| 2015/0047361 A1 | 2/2015 | Williams et al. | |
| 2016/0265780 A1 | 9/2016 | Patel et al. | |
| 2016/0348913 A1 | 12/2016 | Ott et al. | |
| 2016/0363321 A1 | 12/2016 | Benjamin et al. | |
| 2017/0298829 A1 | 10/2017 | Ozem et al. | |

FOREIGN PATENT DOCUMENTS

| | | |
|---|---|---|
| JP | 47-12180 | 5/1972 |
| JP | 4712180 Y1 * | 5/1972 |
| JP | 63-150430 A | 6/1988 |
| JP | 64-29666 A | 1/1989 |
| JP | 2003-314300 A | 11/2003 |
| JP | 2011-520055 A | 7/2011 |
| JP | 5193695 B2 | 5/2013 |
| JP | 2016-508593 A | 3/2016 |
| JP | 2016-173225 A | 9/2016 |
| JP | 2017-106709 A | 6/2017 |
| WO | 2013/115671 A1 | 8/2013 |

OTHER PUBLICATIONS

Extended European Search Report dated Oct. 24, 2023, issued in counterpart European Application No. 20878234.2.

* cited by examiner

LIQUID FUEL INJECTOR

TECHNICAL FIELD

The present disclosure relates to a liquid fuel injector and particularly to a liquid fuel injector used in a combustor for a gas turbine engine.

BACKGROUND ART

To burn a liquid fuel in a combustor for a gas turbine engine, it is preferable to atomize the liquid fuel in order to promote vaporization of the liquid fuel and mixing with combustion air. The atomization of the liquid fuel also contributes to reduction of the amounts of discharged NOx (nitrogen oxides), unburned fuel, and CO (carbon monoxide) through an increase in speed of the combustion reaction.

As one of the atomization schemes of the liquid fuel, there is an airblast scheme. This is a scheme in which a liquid fuel injected as an annular liquid film is atomized using a shear force (caused by a velocity difference) acting between the annular liquid film and swirling air flows adjacently flowing on a radially inner and outer side of the annular liquid film.

As a liquid fuel injector for a combustor of a gas turbine engine in the related art, a liquid fuel injector with a multiple-injector structure in which a plurality of airblast-type injectors are concentrically placed is known.

In the liquid fuel injector with the multiple-injector structure, an airblast-type injector with a small flow rate of injection placed on a radially inner side is used as a pilot injector (primary injector) that operates over an entire operation range from a start of the gas turbine engine to a rated load operation, and an airblast-type injector with a large flow rate of injection placed on a radially outer side is used as a main injector (secondary injector) that operates in a high-load operation range of the gas turbine engine (hereinafter, referred to as a "first feature"; see Patent Documents 1 and 2).

Also, swirlers provided in air passages on the radially inner and outer side in each airblast-type injector are formed as helical vanes with center lines of the profiles (sectional shapes) inclined in the circumferential direction at a substantially constant angle with respect to the axial direction over the entire range from the leading edge to the trailing edge, for example (hereinafter, referred to as a "second feature"; see Patent Documents 1 and 2).

Moreover, both the air passages on the radially inner and outer side in each airblast-type injector have throttle portions (i.e., portions with passage areas reducing toward the downstream side) on the downstream side of the swirler and are formed to increase an angular velocity applied to an airflow by the swirler and to generate a strong swirling air flow. Such a strong swirling air flow spreads to the outside in the radial direction by an effect of a centrifugal force and thus has an effect of causing spray of the liquid fuel to expand in a conical shape. Note that the air passage on the radially outer side is directed to the inside in the radial direction in order to appropriately control the spreading of the swirling air flow flowing out of the air passage on the radially inner side to the outside in the radial direction (hereinafter, referred to as a "third feature"; see Patent Documents 1 and 2).

Also, the airblast-type injector placed on the radially inner side includes, at a center portion of an outlet portion in the radial direction, a rod-shaped member with a diameter increasing in a trumpet shape toward the rear side, which is called a pintle. An atomized air flow flowing in the surroundings of the pintle spreads in a conical shape along the portion of the pintle expanding in a trumpet shape, and this causes dispersibility of the spray of the liquid fuel to be improved (hereinafter, referred to as a "fourth feature").

Related Art Document

Patent Document

Patent Document 1: Japanese Patent No. 5193695
Patent Document 2: U.S. Pat. No. 10,190,774

SUMMARY OF THE DISCLOSURE

Problems to be Solved by the Disclosure

However, the individual airblast-type injectors constituting the liquid fuel injector with the multiple-injector structure described above have a characteristic that atomization performance is deteriorated with a decrease in flow velocity of air passing through its inside. Therefore, at the time of a start of the gas turbine engine when a flow rate of air is small, ignitability of the pilot injector is deteriorated and there was a possibility that the gas turbine engine cannot be smoothly started. Also, in a case in which lean burning is performed to reduce the amount of discharged NOx at the time of the high-load operation of the gas turbine engine, combustion stability of both the main injector and the pilot injector may be degraded under the low-load condition, and in particular, blowing-off may occur at the time of rapid acceleration or deceleration (at the time of a rapid variation in load) of the gas turbine engine.

An object of the present disclosure, which has been made in view of the problems as described above, is to provide a liquid fuel injector capable of improving ignitability under an operating condition of a small flow rate of air and combustion stability under a wide range of operating conditions.

Means for Solving the Problems

In order to solve the aforementioned problem, a liquid fuel injector according to the present disclosure includes: a cylindrical primary fuel injecting body having a central axis; an annular shroud concentrically placed radially outside the primary fuel injecting body; and an annular secondary fuel injecting body placed concentrically with the primary fuel injecting body and the shroud between the primary fuel injecting body and the shroud, in which a plurality of inner swirlers placed at equal intervals in a circumferential direction are provided in an annular inner air passage formed between the primary fuel injecting body and the secondary fuel injecting body, a plurality of outer swirlers placed at equal intervals in the circumferential direction are provided in an annular outer air passage formed between the secondary fuel injecting body and the shroud, the primary fuel injecting body is formed as a pressure spray-type injector, and the secondary fuel injecting body, the inner air passage, and the outer air passage cooperatively constitute an airblast-type injector.

Effects of the Disclosure

According to the liquid fuel injector of the present disclosure, it is possible to obtain an excellent effect that it is possible to improve ignitability under an operating condition of a small flow rate of air and combustion stability under a wide range of operating conditions.

MODE FOR CARRYING OUT THE DISCLOSURE

Hereinafter, an embodiment of the present disclosure will be described in detail with reference to the drawings.

Figure 1:
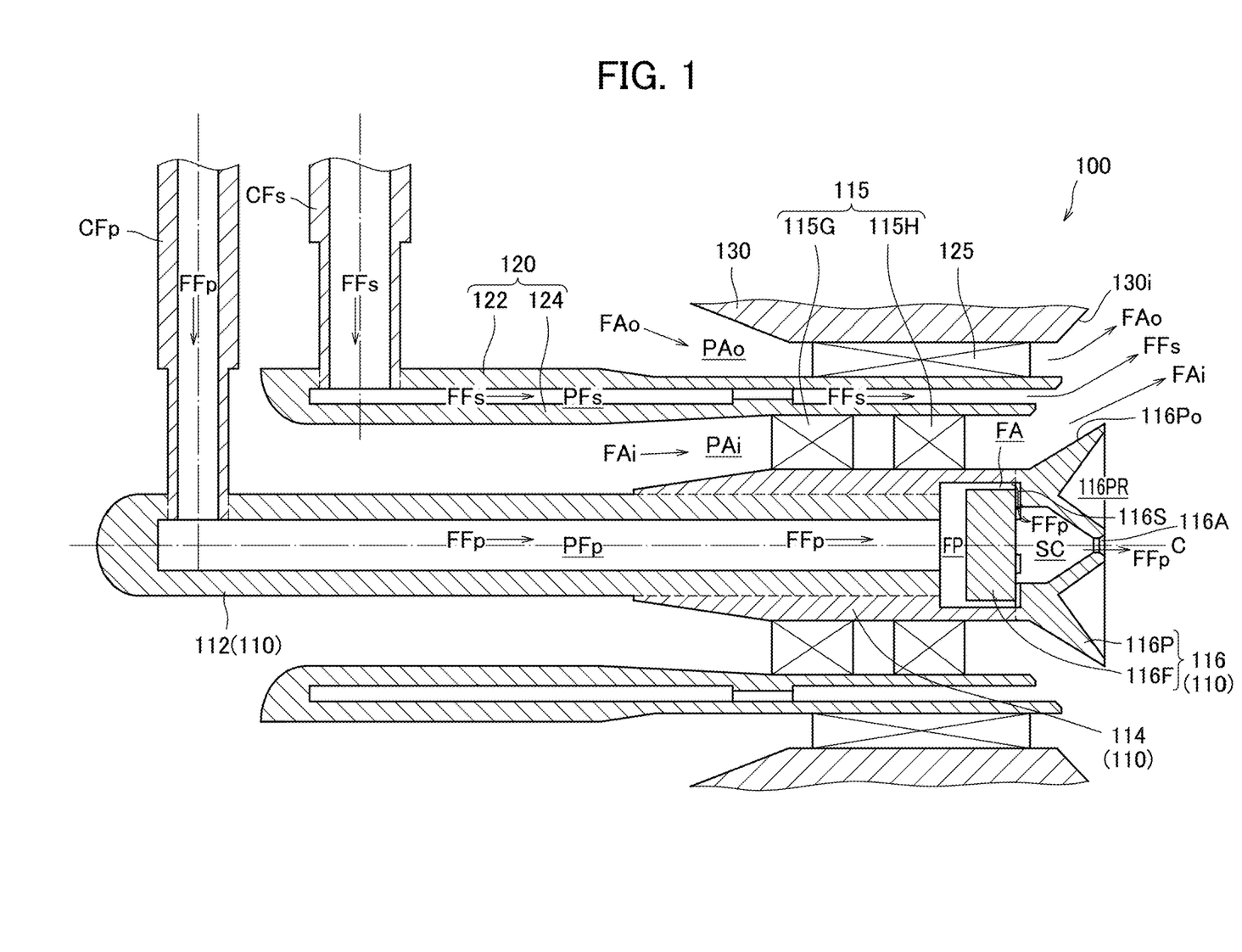
FIG. 1 is an overall schematic sectional view of a liquid fuel injector according to an embodiment of the present disclosure.

FIG. 1 is an overall schematic sectional view of a liquid fuel injector according to an embodiment of the present disclosure. Note that an upstream side and a downstream side in a flow direction of air and a liquid fuel inside the liquid fuel injector will be referred to as a front side and a rear side, respectively, in the description.

A liquid fuel injector 100 includes a cylindrical primary fuel injecting body 110 having a central axis C, an annular shroud 130 concentrically placed radially outside the primary fuel injecting body 110, and an annular secondary fuel injecting body 120 placed concentrically with the primary fuel injecting body 110 and the shroud 130 between the primary fuel injecting body 110 and the shroud 130. Note that the liquid fuel injector 100 can be used in a combustor for a gas turbine engine, for example.

Here, the primary fuel injecting body 110 is connected to the secondary fuel injecting body 120 via inner swirlers 115, which will be described later, the secondary fuel injecting body 120 is connected to the shroud 130 via outer swirlers 125, which will be described later, and the liquid fuel injector 100 constituted by these components is integrally formed as a whole. Note that an additive manufacturing (AM) technique (laminate shaping technique) using a 3D printer, for example, is effectively applied to the integral formation of the liquid fuel injector 100.

The primary fuel injecting body 110 includes a fuel feeding pipe portion 112, a sleeve portion 114 located at an outer periphery of the fuel feeding pipe portion 112 on a rear end side, and a fuel injection tip portion 116 located on a rear end side of the sleeve portion 114. Note that although the fuel feeding pipe portion 112 and the sleeve portion 114, and the sleeve portion 114 and the fuel injection tip portion 116 are illustrated in a sectioned manner with dashed lines in FIG. 1 for convenience of explanation, these members may be formed integrally with a primary fuel supply piping portion CFp, which will be described later, in practice.

The fuel feeding pipe portion 112 is a cylindrical pipe and includes a primary fuel passage PFp formed therein. A primary fuel, which is a liquid fuel, is supplied to the primary fuel passage PFp through the primary fuel supply piping portion CFp connected to the vicinity of a front end of the fuel feeding pipe portion 112. Note that the connecting portion of the primary fuel supply piping portion CFp is not limited to the vicinity of the front end of the fuel feeding pipe portion 112 and may be an arbitrary location.

The sleeve portion 114 is a cylindrical portion located at an outer periphery of the fuel feeding pipe portion 112 on the rear end side. A fuel plenum FP, which is a columnar space, is formed inside the rear portion of the sleeve portion 114 between a rear end of the fuel feeding pipe portion 112 and a front surface of a front projecting portion 116F of the fuel injection tip portion 116, which will be described later. Also, an annular fuel annulus FA is formed between an inner surface of a rear end portion of the sleeve portion 114 and an outer surface of the front projecting portion 116F of the aforementioned fuel injection tip portion 116. Note that the shape of the fuel plenum FP is not limited to the columnar shape and may be a conical shape, a truncated conical shape, a semi-spherical shape, or the like.

The fuel injection tip portion 116 is a portion located on the rear end side of the sleeve portion 114 and is constituted by a pintle portion 116P including a columnar front portion and a truncated conical-shaped rear portion with a diameter increasing toward the rear side and the columnar front projecting portion 116F projecting forward from a front surface of the pintle portion 116P.

A swirl chamber SC including a columnar front space and a truncated conical-shaped rear space with a diameter decreasing toward the rear side is formed at the center portion of the pintle portion 116P in the radial direction, and a rear end of the swirl chamber SC communicates with a backward space via a fuel injection hole 116A.

Also, a plurality of (four, for example) swirl applying passages 116S connecting the fuel annulus FA and the swirl chamber SC described above are provided at equal intervals in the circumferential direction in the front surface of the pintle portion 116P.

The swirl applying passages 116S are formed to cause the primary fuel, which has flowed in from the fuel annulus FA, to flow out to the inside of the swirl chamber SC in a state in which a swirling velocity component around the central axis C is included. Therefore, the swirl applying passages 116S may be formed such that an outlet end is connected to an outer periphery of the columnar front portion of the swirl chamber SC in a tangential direction, for example.

The primary fuel flows into the primary fuel passage PFp inside the fuel feeding pipe portion 112 from the primary fuel supply piping portion CFp and then flows into the fuel annulus FA from the fuel plenum FP as illustrated by the arrow FFp in the primary fuel injecting body 110 formed as described above. Thereafter, the primary fuel flows into the swirl chamber SC in a state in which a swirling velocity component is included via the swirl applying passages 116S, is injected via the fuel injection hole 116A in a state in which the swirling velocity component is maintained, and forms fuel spray spreading in a conical shape.

In this manner, the primary fuel injecting body 110 functions as a pressure spray-type injector. The pressure spray-type injector has atomization performance that is not affected by the flow rate of air unlike the airblast-type injector and exhibits good atomization performance under a wide range of operating conditions. Therefore, it is possible to improve ignitability under an operating condition of a small flow rate of air and combustion stability under a wide range of operating conditions in the liquid fuel injector 100 as compared with a liquid fuel injector with a multiple-injector structure in which a plurality of airblast-type injectors are concentrically placed (see the first feature described in the section of Background Art), by employing the primary fuel injecting body 110 formed as a pressure spray-type injector.

The secondary fuel injecting body 120 is a double circular pipe in which an annular outer wall 122 and an inner wall 124 are integrally formed and includes an annular secondary fuel passage PFs formed therein. Note that the outer wall 122 and the inner wall 124 are formed integrally with the secondary fuel supply piping portion CFs, which will be described later.

A secondary fuel, which is a liquid fuel, is supplied to the secondary fuel passage PFs through the secondary fuel supply piping portion CFs connected to the vicinity of a front end of the outer wall 122. Note that the connecting portion of the secondary fuel supply piping portion CFs is not limited to the vicinity of the front end of the outer wall 122 and may be an arbitrary location.

In the secondary fuel injecting body 120 formed in this manner, the secondary fuel flows into the secondary fuel passage PFs from the secondary fuel supply piping portion CFs and is then injected as an annular liquid film from the downstream end as illustrated by the arrow FFs.

An annular inner air passage PAi and an outer air passage PAo are formed between the primary fuel injecting body 110 and the secondary fuel injecting body 120 (more strictly, the inner wall 124) and between the secondary fuel injecting body 120 (more strictly, the outer wall 122) and the shroud 130, respectively. Also, a plurality of inner swirlers 115 are placed at equal intervals in the circumferential direction between the sleeve portion 114 of the primary fuel injecting body 110 and the inner wall 124 of the secondary fuel injecting body 120 in the inner air passage PAi. Similarly, a plurality of outer swirlers 125 are placed at equal intervals in the circumferential direction in the outer air passage PAo.

Air flows into the inner air passage PAi and the outer air passage PAo as illustrated by the arrows FAi and FAo, respectively, swirling is applied when the air passes through the inner swirlers 115 and the outer swirlers 125, and the air flows out as a swirling air flow having a circumferential velocity component.

The secondary fuel injecting body 120 formed as described above, the inner air passage PAi including the inner swirlers 115, and the outer air passage PAo including the outer swirlers 125 cooperatively function as an airblast-type injector IAB. In other words, the secondary fuel, which is a liquid fuel, is injected as an annular liquid film from the downstream end of the secondary fuel injecting body 120 as illustrated by the arrow FFs. Since the injected liquid fuel does not substantially include a circumferential velocity component at this time, a shear force caused by a velocity difference between the air flows FAi and FAo flowing out from the inner air passage PAi and the outer air passage PAo, respectively, in a state in which the circumferential velocity component is included as described above acts, and the liquid fuel is thus atomized.

Here, the aforementioned airblast-type injector TAB in the liquid fuel injector 100 according to the embodiment of the present disclosure has a feature in the shape of the downstream end portions of the inner air passage PAi and the outer air passage PAo, which will be described below in detail.

In the liquid fuel injector 100 according to the embodiment of the present disclosure, the downstream end portions of the inner air passage PAi and the outer air passage PAo do not have throttle portions and are also formed such that a swirling air flow flowing out therefrom is directed in the axial direction (the direction of the central axis C) or radially outward.

Specifically, both (the outer surface of) a columnar-shaped front portion of the pintle portion 116P of the fuel injection tip portion 116 of the primary fuel injecting body 110 and (the inner surface of) the inner wall 124 of the secondary fuel injecting body 120, which define the radially inner and outer boundaries of the downstream end portion of the inner air passage PAi (the portion on the downstream side of the inner swirlers 115) are formed to have a constant diameter along the axial direction at least at portions facing each other in the radial direction. Similarly, both (the outer surface of) the outer wall 122 of the secondary fuel injecting body 120 and (the inner surface of) the shroud 130, which define the radially inner and outer boundaries of the downstream end portion of the outer air passage PAo (the portion on the downstream side of the outer swirlers 125) are formed to have a constant diameter along the axial direction at least at portions facing each other in the radial direction.

In this manner, both the inner air passage PAi and the outer air passage PAo do not have throttle portions at the downstream end portions.

An outer surface 116Po of the truncated conical-shaped rear portion of the pintle portion 116P of the fuel injection tip portion 116 of the primary fuel injecting body 110 that defines the radially inner boundary of the inner air passage PAi has a shape with a diameter increasing toward the rear side as described above on the rear side of the downstream end of the inner wall 124 of the secondary fuel injecting body 120 that defines the radially outer boundary of the passage. Similarly, an inner surface 130i of the shroud 130 that defines the radially outer boundary of the outer air passage PAo has a shape with a diameter increasing toward the rear side on the rear side of the downstream end of the outer wall 122 of the secondary fuel injecting body 120 that defines the radially inner boundary of the passage.

In this manner, the swirling air flow flowing out of the inner air passage PAi is guided by the outer surface 116Po (inner swirling air flow guide portion) of the truncated conical-shaped rear portion of the pintle portion 116P of the fuel injection tip portion 116 of the primary fuel injecting body 110, the swirling air flow flowing out of the outer air passage PAo is guided by the inner surface 130i (outer swirling air flow guide portion) of the shroud 130, and each of the air flows is directed radially outward.

As described above, the airblast-type injector IAB of the liquid fuel injector 100 according to the embodiment of the present disclosure employs the aforementioned inner and outer swirling air flow guide portions instead of the air flow throttle used as means for directing the swirling air flow radially outward in the airblast-type injector in the related art (see the third feature described in the section of Background Art). Therefore, flow patterns of the swirling air flow can be easily controlled in a direct manner, and it is possible to obtain a swirling air flow and fuel spray spreading radially outward in a desired manner. Also, since both the inner air passage PAi and the outer air passage PAo do not have throttle portions, it is possible to use the maximum passage area that can be realized in terms of the structure of the liquid fuel injector 100 and to construct the liquid fuel injector 100 in a compact size.

Here, the aforementioned airblast-type injector IAB in the liquid fuel injector 100 according to the embodiment of the present disclosure has features in the aspects of the inner swirlers 115 and the outer swirlers 125 in addition to the aforementioned features, which will be described below in detail.

In the illustrated embodiment, the inner swirlers 115 include a guide vane 115G placed on the upstream side (front side) and a helical vane 115H placed on the downstream side (rear side) inside the inner air passage PAi.

Among these, the helical vane 115H is similar to that used in the airblast-type injector in the related art and has a center line of a profile (sectional shape) inclined in the circumferential direction at a substantially constant angle with respect to the axial direction over the entire range from the leading edge to the trailing edge (see the second feature described in the section of Background Art).

The guide vane 115G is for changing the direction of the air flow flowing in through the inner air passage PAi and has a center line of a profile substantially directed in the axial direction at the leading edge and substantially directed, at the trailing edge, in the same direction as the center line of the profile of the helical vane 115H at the leading edge.

The air passing through the inner swirlers 115 formed as described above flows into the guide vane 115G substantially in the axial direction via the inner air passage PAi, the direction is then changed when the air passes through the guide vane 115G, the air smoothly (that is, in a state in which an incidence is substantially zero) flows into the helical vane 115H placed on the downstream side, swirling is applied when the air passes through the helical vane 115H, and the air flows out as a swirling air flow.

In a case in which the swirlers include only helical vanes as in the airblast-type injector in the related art, the air flow flowing into the helical vanes substantially in the axial direction is highly likely to separate on the downstream side of the leading edges of the helical vanes. Therefore, the swirlers in the airblast-type injector in the related art has a problem such as an increase in pressure loss or a decrease in flow rate due to a decrease in effective passage area due to the separation.

On the other hand, the swirlers 115 in the liquid fuel injector 100 according to the embodiment of the present disclosure prevent the separation of the air flow on the downstream side of the leading edge of the helical vane 115H by placing the guide vane 115G on the upstream side of the helical vane 115H. In this manner, since it is possible to secure a large effective passage area as compared with the case of the airblast-type injector in the related art, the actual passage area of the swirlers used to obtain the same flow rate of air is thus reduced to be small, and it is possible to construct the liquid fuel injector 100 in a compact size.

Note that the guide vane 115G and the helical vane 115H are placed at an interval in the axial direction (that is, in a state in which an annular space is provided therebetween) in the illustrated embodiment. This is for reducing non-uniformity in a case in which the air flow flowing into the inner swirlers 115 via the inner air passage PAi is a non-uniform flow with total pressure distribution in the circumferential direction due to the placement of the primary fuel supply piping portion CFp on the upstream side, for example. In other words, although the air flow flowing into the guide vane 115G in the state in which the total pressure distribution in the circumferential direction is included flows out of the guide vane 115G in a state in which the total pressure distribution is substantially maintained, the non-uniformity of the total pressure in the circumferential direction is alleviated in the annular space formed with the helical vane 115H, and the air flow then flows into the helical vane 115H. In this manner, the air flows out of the helical vane 115H as a substantially uniform flow in the circumferential direction.

Since influences of the non-uniformity in the circumferential direction due to a structure placed on the upstream side of the inner air passage PAi more significantly appear in the inner air passage PAi with a smaller diameter than the outer air passage PAo as compared with the case of the outer air passage PAo, it is particularly preferable to employ the swirlers 115 with a structure split into the guide vane 115G and the helical vane 115H as described above.

Note that the swirlers 115 may be formed as an integral vane with the trailing edge of the guide vane 115G and the leading edge of the helical vane 115H connected to each other in a case in which the non-uniformity of the flowing-in air flow in the circumferential direction is small to an allowable extent, for example.

Further, although the outer swirlers 125 are formed as an integral vane including a guide vane portion formed similarly to the guide vane 115G in the inner swirlers 115 and a helical vane portion formed similarly to the helical vane 115H in the inner swirlers 115 in the illustrated embodiment, the guide vane portion and the helical vane portion may be placed at an interval in the axial direction similarly to the inner swirlers 115.

Here, the fuel injection tip portion 116 of the primary fuel injecting body 110 in the liquid fuel injector 100 according to the embodiment of the present disclosure has a feature in the shape of the pintle portion 116P, which will be described below in detail.

The rear portion of the pintle portion 116P is formed into a truncated conical shape with a diameter increasing toward the rear side as described above. The shape is similar to the shape of the pintle employed in the airblast-type injector in the related art (see the fourth feature described in the section of Background Art), and a circulating flow is generated on the downstream side of the rear end outer peripheral portion thereof.

Figure 2A:
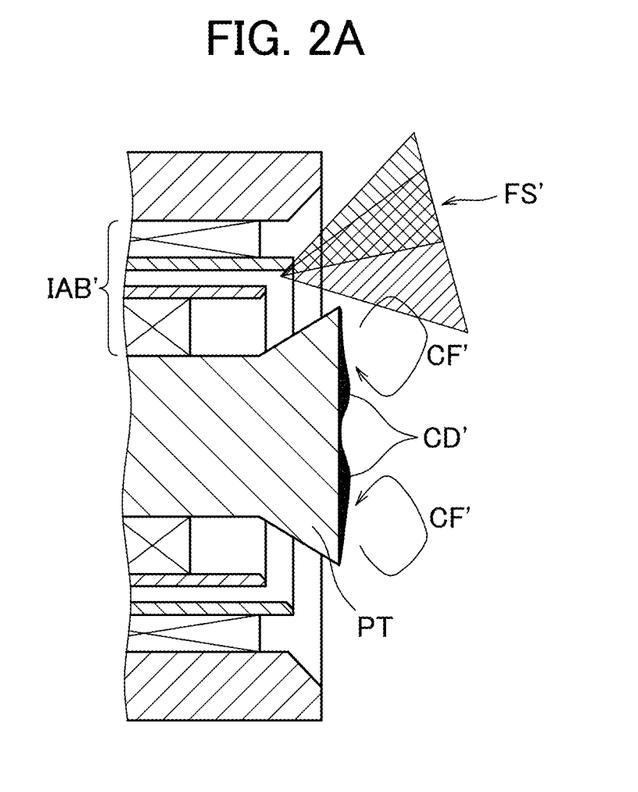
FIG. 2A is a diagram for explaining an aspect of a circulating flow generated on a downstream side of a rear end outer peripheral portion of a pintle with no recessed portion in a fuel injection tip portion of a primary fuel injecting body of a liquid fuel injector in the related art.

However, a pintle PT in the related art has trends that a circulating flow CF' generated at a rear end outer peripheral portion is small and fuel liquid droplets involved in the circulating flow CF' on the radially innermost side of a fuel spray FS' generated by an airblast-type injector IAB' and returned to the upstream side adhere to the rear surface of the pintle PT in an unevaporated state, as illustrated in FIG. 2A. The adhering fuel droplets are carbonized due to a heat input from a combustion region located on the downstream side and are accumulated as carbon on the rear surface of the pintle PT, and if the accumulated carbon CD' sticks out in the radial direction from the rear end outer peripheral portion of the pintle PT, for example, the carbon CD' inhibits an air flow in the surroundings, which is not preferable.

Thus, in the liquid fuel injector 100 according to the embodiment of the present disclosure, an annular recessed portion 116PR with a triangular section depressed forward is formed in the rear surface of the pintle portion 116P of the fuel injection tip portion 116. In this manner, the central portion of the pintle portion 116P with the fuel injection hole 116A formed therein is brought into a state in which the central portion projects backward from the bottom portion of the recessed portion 116PR.

Figure 2B:
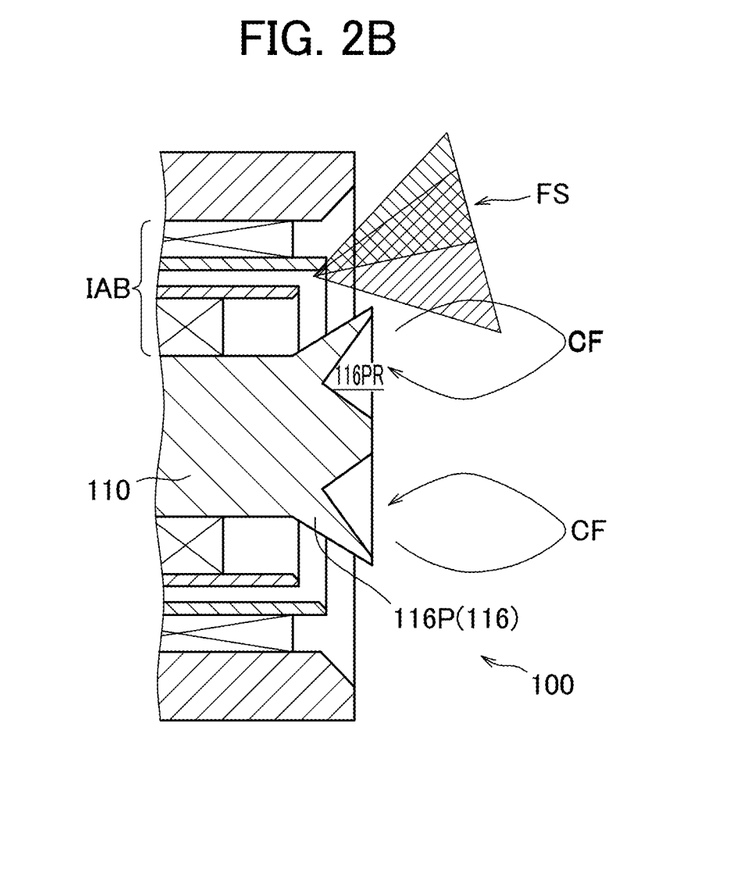
FIG. 2B is a diagram for explaining an aspect of a circulating flow generated on a downstream side of a rear end outer peripheral portion of a pintle with a recessed portion formed in a rear surface in a fuel injection tip portion of a primary fuel injecting body of the liquid fuel injector in FIG. 1.

If the recessed portion 116PR is formed in the rear surface of the pintle portion 116P in this manner, the rear end outer peripheral portion of the pintle portion 116P has a shape sharpened toward the rear side. As a result, the circulating flow generated there increases in size (see FIG. 2B), and the fuel liquid droplets involved in the circulating flow CF on the radially innermost side of the fuel spray FS generated by the airblast-type injector IAB and returned to the upstream side collide against the rear surface of the pintle portion 116P in a state in which the fuel liquid droplets have already been evaporated and become gas. The fuel in such a gas state does not adhere to the rear surface of the pintle portion 116P, and no carbon is thus accumulated there. Further, it is possible to prevent the primary fuel injected from the fuel injection hole 116A formed at the central portion of the pintle portion 116P from being involved in an attracting air flow and adhering to the recessed portion 116PR by the central portion of the pintle portion 116P projecting backward from the bottom portion of the recessed portion 116PR.

As described above, the liquid fuel injector 100 according to the embodiment of the present disclosure can prevent carbon accumulation from occurring on the rear surface of the pintle portion 116P of the fuel injection tip portion 116 of the primary fuel injecting body 110 corresponding to the pintle in the airblast-type injector in the related art.

Here, the passage for the primary fuel from the fuel plenum FP to the swirl chamber SC is formed from the annular fuel annulus FA and the swirl applying passage 116S in the primary fuel injecting body 110 in the aforementioned embodiment. However, the passage may be formed in a different manner.

Figure 3A:
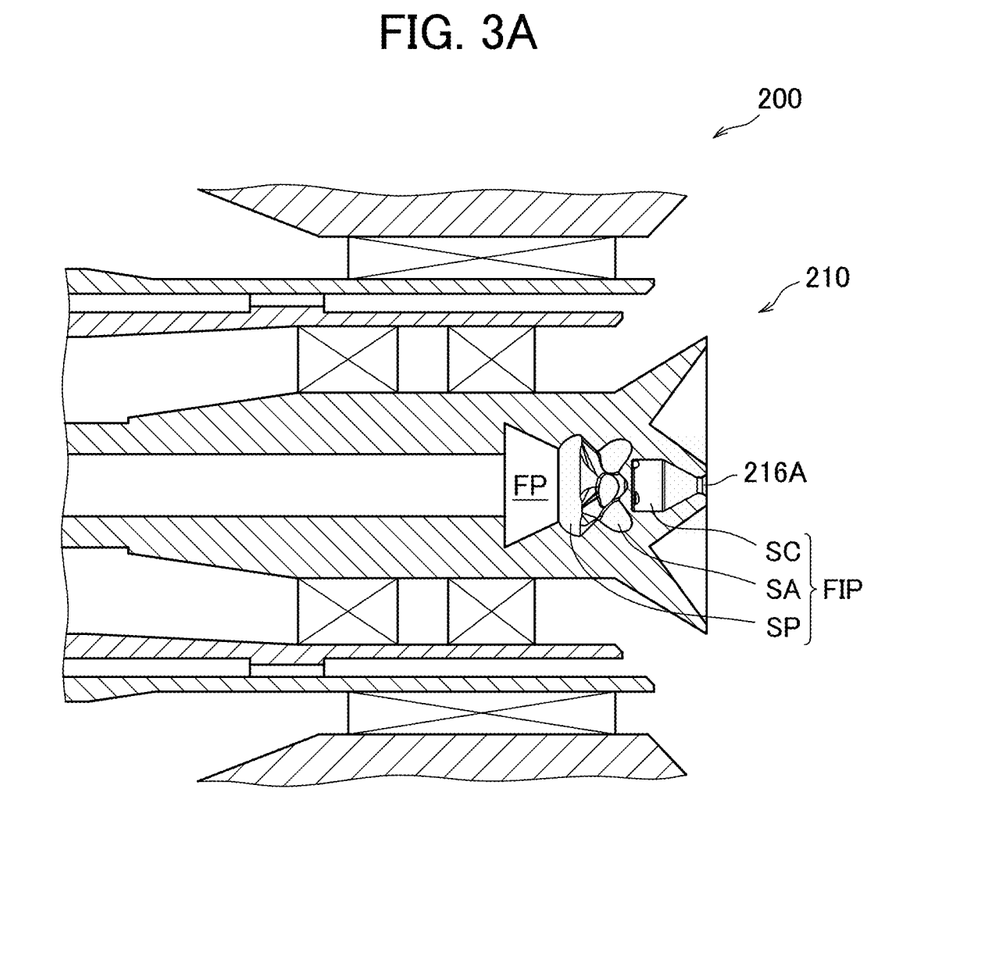
FIG. 3A is a diagram for explaining a liquid fuel injector according to another embodiment of the present disclosure and illustrates a schematic sectional view of main components of the liquid fuel injector.

FIG. 3A is a schematic sectional view of main components of a liquid fuel injector 200 according to another embodiment of the present disclosure.

The outer shape of a primary fuel injecting body 210 is the same as the outer shape of the primary fuel injecting body 110 in the liquid fuel injector 100 illustrated in FIG. 1, and a fuel injection hole 216A is formed at a central portion of the rear end thereof in the radial direction.

Figure 3B:
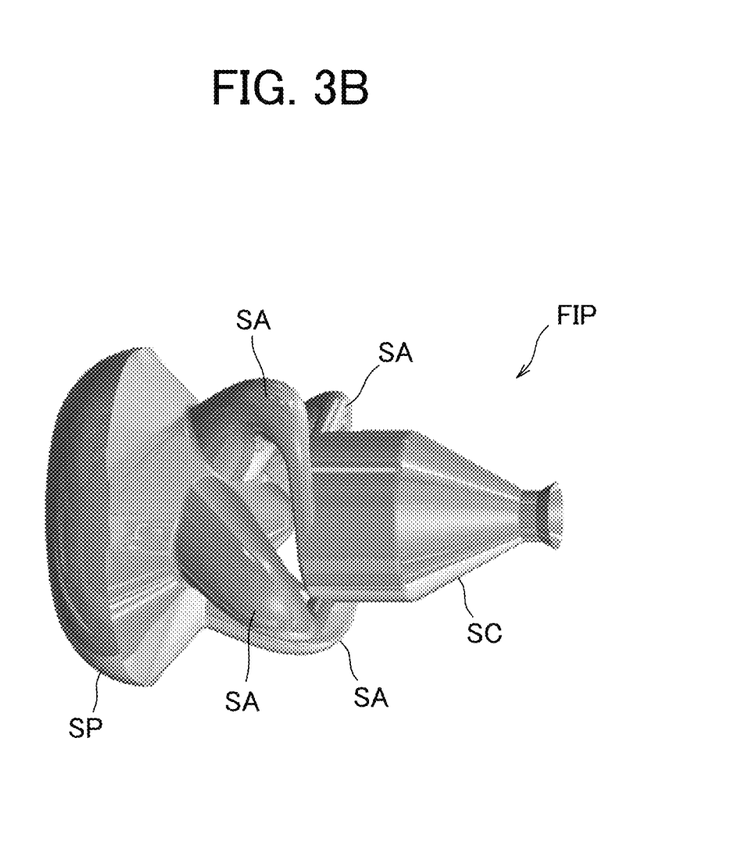
FIG. 3B is a diagram for explaining a liquid fuel injector according to another embodiment of the present disclosure and illustrates an overall schematic perspective view of a fuel injection passage formed in a fuel injection passage forming body.

A fuel injection passage FIP formed inside the primary fuel injecting body 210 includes a supply plenum SP communicating with a fuel plenum FP, a swirl chamber SC including a columnar front portion and a truncated conical-shaped rear portion with a diameter decreasing toward the rear side, and a plurality of (four, for example) swirl applying passages SA connecting the supply plenum SP to the swirl chamber SC as illustrated in FIG. 3B. Each of the plurality of swirl applying passages SA is formed to cause a primary fuel flowing in from the supply plenum SP to flow out to the inside of the swirl chamber SC in a state in which a swirling velocity component is included. Therefore, the swirl applying passages SA may be formed such that outlet ends thereof are connected to the outer periphery of the columnar front portion of the swirl chamber SC in the tangential direction. Also, the swirl applying passages SA are preferably formed to have a smooth shape with no bent portion as illustrated in the drawing in order to reduce a pressure loss therein to be as low as possible.

(Aspects of the Present Disclosure)

A liquid fuel injector according to a first aspect of the present disclosure includes: a cylindrical primary fuel injecting body having a central axis; an annular shroud concentrically placed radially outside the primary fuel injecting body; and an annular secondary fuel injecting body placed concentrically with the primary fuel injecting body and the shroud between the primary fuel injecting body and the shroud, in which a plurality of inner swirlers placed at equal intervals in a circumferential direction are provided in an annular inner air passage formed between the primary fuel injecting body and the secondary fuel injecting body, a plurality of outer swirlers placed at equal intervals in the circumferential direction are provided in an annular outer air passage formed between the secondary fuel injecting body and the shroud, the primary fuel injecting body is formed as a pressure spray-type injector, and the secondary fuel injecting body, the inner air passage, and the outer air passage cooperatively constitute an airblast-type injector.

In the liquid fuel injector according to a second aspect of the present disclosure, a primary fuel passage formed inside the primary fuel injecting body includes a fuel plenum, a fuel annulus that is an annular space connected directly to the fuel plenum, and a swirl chamber that is a columnar space connected to the fuel annulus via a plurality of swirl applying passages, and the swirl applying passages cause a fuel, which has flowed in from the fuel annulus, to flow out to inside of the swirl chamber in a state in which a swirling velocity component around the central axis is included.

In the liquid fuel injector according to a third aspect of the present disclosure, the inner swirlers and the outer swirlers include guide vanes placed on an upstream side and helical vanes placed on a downstream side in a flowing direction of air inside the inner air passage and the outer air passage, respectively, center lines of profiles of the helical vanes are inclined in the circumferential direction at a substantially constant angle with respect to a direction of the central axis over an entire range from leading edges to trailing edges, and center lines of profiles of the guide vanes are substantially directed, at leading edges, in the direction of the central axis and are substantially directed, at trailing edges, in a same direction as the center lines of the profiles of the helical vanes at the leading edges.

In the liquid fuel injector according to a fourth aspect of the present disclosure, in at least either the inner swirlers or the outer swirlers, the guide vane and the helical vane are placed at an interval in the direction of the central axis.

In the liquid fuel injector according to a fifth aspect of the present disclosure, in at least either the inner swirlers or the outer swirlers, the guide vane and the helical vane are integrally formed.

In the liquid fuel injector according to a sixth aspect of the present disclosure, a radially inner boundary and a radially outer boundary of the inner air passage on a downstream side of the inner swirlers have a constant diameter along the direction of the central axis at least at a portion at which the radially inner boundary and the radially outer boundary face each other in the radial direction, and a radially inner boundary and a radially outer boundary of the outer air passage on the downstream side of the outer swirlers have a constant diameter along the direction of the central axis at least at a portion at which the radially inner boundary and the radially outer boundary face each other in the radial direction.

In the liquid fuel injector according to a seventh aspect of the present disclosure, a guide portion for directing a flow of air flowing out from each of the inner air passage and the outer air passage to radially outside is provided on the downstream side of a downstream end of each of the air passages.

In the liquid fuel injector according to an eighth aspect of the present disclosure, an inner swirling air flow guide portion that is the guide portion for a flow of air flowing out from the inner air passage is formed by an outer surface of a truncated conical-shaped portion with a diameter increasing toward the downstream side that is provided at a downstream end of the primary fuel injecting body, and an outer swirling air flow guide portion that is the guide portion for a flow of air flowing out from the outer air passage is formed by a portion of an inner surface of the shroud with a diameter increasing toward the downstream side.

In the liquid fuel injector according to a ninth aspect of the present disclosure, an annular recessed portion with a triangular section depressed toward the upstream side is formed in a downstream end surface of the truncated conical-shaped portion of the primary fuel injecting body, and a central portion of the truncated conical shape in which a fuel injection hole is formed thus projects from a bottom portion of the recessed portion toward the downstream side.

EXPLANATION OF REFERENCE SIGNS

110 Primary fuel injecting body
115 Inner swirler
115G Guide vane
115H Helical vane
116S Swirl applying passage
116Po Outer surface of pintle portion of fuel injection tip portion of primary fuel injecting body (inner swirling air flow guide portion)
116PR Annular recessed portion provided in rear surface of pintle portion of fuel injection tip portion of primary fuel injecting body
120 Secondary fuel injecting body
125 Outer swirler
130 Shroud
130i Shroud inner surface (outer swirling air flow guide portion)
FA Fuel annulus
FP Fuel plenum
PAi Inner air passage
PAo Outer air passage
SC Swirl chamber

The invention claimed is:

1. A liquid fuel injector comprising:
a cylindrical primary fuel injecting body having a central axis;
an annular shroud concentrically placed radially outside the primary fuel injecting body; and
an annular secondary fuel injecting body placed concentrically with the primary fuel injecting body and the shroud between the primary fuel injecting body and the shroud,
wherein a plurality of inner swirlers placed at equal intervals in a circumferential direction are provided in an annular inner air passage formed between the primary fuel injecting body and the secondary fuel injecting body,
a plurality of outer swirlers placed at equal intervals in the circumferential direction are provided in an annular outer air passage formed between the secondary fuel injecting body and the shroud,
the primary fuel injecting body is formed as a pressure spray-type injector,
the secondary fuel injecting body, the inner air passage, and the outer air passage cooperatively constitute an airblast-type injector,
the inner swirlers and the outer swirlers each include a plurality of guide vanes placed on an upstream side and a plurality of helical vanes placed on a downstream side in a flowing direction of air inside the inner air passage and the outer air passage, respectively,
center lines of profiles of the helical vanes are inclined in the circumferential direction at a substantially constant angle with respect to a direction of the central axis over an entire range from leading edges to trailing edges, and
center lines of profiles of the guide vanes are substantially directed, at the leading edges, in the direction of the central axis and are substantially directed, at the trailing edges, in a same direction as the center lines of the profiles of the helical vanes at the leading edges.

2. The liquid fuel injector according to claim 1,
wherein a primary fuel passage formed inside the primary fuel injecting body includes
a fuel plenum,
a fuel annulus that is an annular space connected directly to the fuel plenum, and
a swirl chamber that is a columnar space connected to the fuel annulus via a plurality of swirl applying passages, and
the swirl applying passages cause a fuel, which has flowed in from the fuel annulus, to flow out to inside of the swirl chamber in a state in which a swirling velocity component around the central axis is included.

3. The liquid fuel injector according to claim 1, wherein in at least either the inner swirlers or the outer swirlers, the guide vanes and the helical vanes are placed at an interval in the direction of the central axis.

4. The liquid fuel injector according to claim 1, wherein in at least either the inner swirlers or the outer swirlers, the guide vanes and the helical vanes are integrally formed.

5. The liquid fuel injector according to claim 1,
wherein a radially inner boundary of the inner air passage on a downstream side of the inner swirlers and a radially outer boundary of the inner air passage on the downstream side of the inner swirlers have a constant diameter along a direction of the central axis at least at a portion at which the radially inner boundary and the radially outer boundary face each other in a radial direction, and
a radially inner boundary of the outer air passage on a downstream side of the outer swirlers and a radially outer boundary of the outer air passage on the downstream side of the outer swirlers have a constant diameter along the direction of the central axis at least at a portion at which the radially inner boundary of the outer air passage on the downstream side of the outer swirlers and the radially outer boundary of the outer air passage on the downstream side of the outer swirlers face each other in the radial direction.

6. The liquid fuel injector according to claim 5, wherein a guide portion for directing a flow of air flowing out from the inner air passage and a guide portion for directing a flow of air flowing out from the outer air passage to radially outside is provided on a downstream side of a downstream end of each of the inner air passage and the outer air passage.

7. The liquid fuel injector according to claim 6,
wherein an inner swirling air flow guide portion that is the guide portion for directing the flow of air flowing out from the inner air passage is formed by an outer surface of a truncated conical-shaped portion with a diameter increasing toward the downstream side of the downstream end of the inner air passage that is provided at a downstream end of the primary fuel injecting body, and
an outer swirling air flow guide portion that is the guide portion for directing the flow of air flowing out from the outer air passage is formed by a portion of an inner surface of the shroud with a diameter increasing toward the downstream side of the downstream end of the outer air passage.

8. The liquid fuel injector according to claim 7, wherein an annular recessed portion with a triangular section depressed toward the upstream side is formed in a downstream end surface of the truncated conical-shaped portion of the primary fuel injecting body, and a central portion of the truncated conical-shaped portion in which a fuel injection hole is formed thus projects from a bottom portion of the annular recessed portion toward the downstream side of the downstream end of the inner air passage.

\* \* \* \* \*